Nov. 28, 1944.    L. REISER    2,363,992

SUPPORT FOR SPHERICAL PRESSURE VESSELS

Filed May 9, 1942

Leo Reiser
INVENTOR.

BY *Elvin A. Andrus*
ATTORNEY.

Patented Nov. 28, 1944

2,363,992

UNITED STATES PATENT OFFICE 2,363,992

SUPPORT FOR SPHERICAL PRESSURE VESSELS

Leo Reiser, Milwaukee, Wis., assignor to A. O. Smith Corporation, Milwaukee, Wis., a corporation of New York Application May 9, 1942, Serial No. 442,391

9 Claims. (Cl. 248—194)

This invention relates to a support for spherical pressure vessels and the like.

It has been applied in the supporting of pressure vessels wherein the internal fluid pressure is a major factor involved in the maintaining of the shape of the vessel and where the weight of the fluid contents is a lesser factor in determining the shape of the vessel.

The principal object of the invention is to utilize an available excess strength of the vessel wall to provide a natural membrane support for the vessel.

Another object is to provide a less costly support for a spherical type pressure vessel, and one which requires less metal for the weight of vessel and contents involved.

Other objects and advantages will appear hereinafter.

An embodiment of the invention is illustrated in the accompanying drawing in which.

Figure 1:
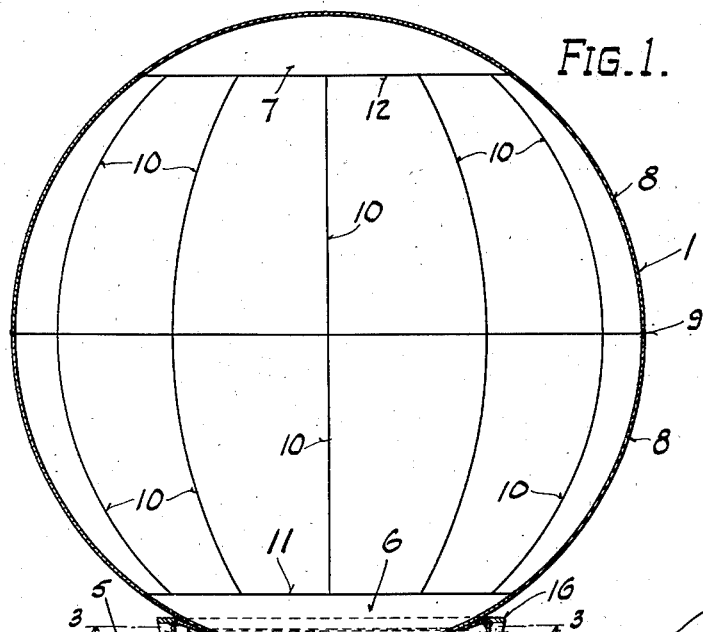
Figure 1 is a vertical central section through a vessel and its support.
Figure 2:
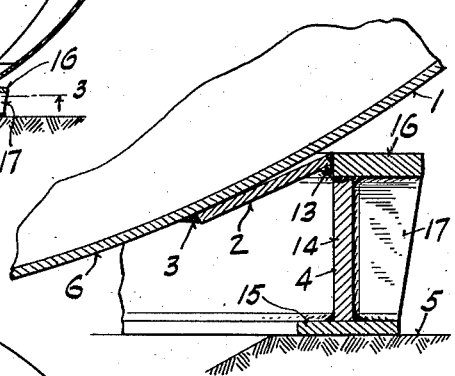
Fig. 2 is an enlarged view of the supporting ring and membrane in similar section.
Figure 3:
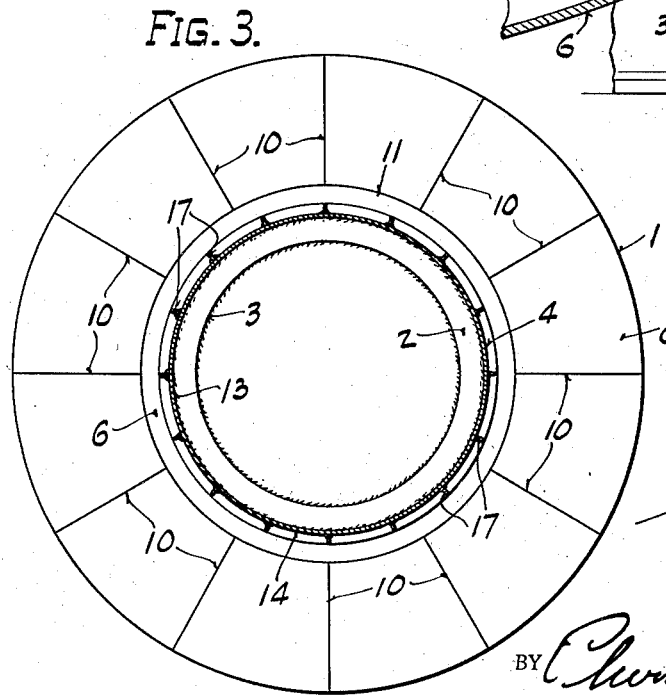
Fig. 3 is a horizontal section through the support looking upwardly at line 3—3 of Fig. 1.

In accordance with the invention the spherical pressure vessel 1 is supported by a conical membrane ring 2 welded at its inner edge by fillet weld 3 to the outer surface of the lower part of the vessel. The membrane ring 2 is welded at its outer edge to a rigid supporting ring 4 resting on a suitable foundation 5.

In the embodiment illustrated, and by way of example, the vessel 1 may be constructed of steel plates of about one-half an inch in thickness and with their edges welded together. The plates are preferably cut and shaped to provide a bottom segment plate 6, a similar top segment plate 7 and two intermediate series of sector-like plates 8, of orange-peel arrangement.

The two series of sector-like plates 8 are joined at the equator or largest horizontal circumference of the tank by a circumferential weld 9 while the several plates 8 are joined to their respective adjacent plates 8 along vertical lines by welds 10. The bottom plate 6 is joined to the lower ends of the lower series of plates 8 by the circular weld 11 and the top plate 7 is similarly joined to the upper ends of the upper series of plates 8 by the circular weld 12.

The vessel thus constructed may be about twenty-seven feet in diameter and may be designed to withstand about one hundred pounds per square inch internal pressure with a factor of safety of three based upon the ultimate tensile strength of the steel and considering the welded joints as having an efficiency of approximately eighty percent of that of the plate stock, a requirement of the past codes. The working pressure is generally sufficient to cause the vessel to retain its substantially spherical shape quite regardless of its support so long as the latter uniformly distributes the weight of the vessel and its contents over a substantial area of contact with the support.

The support of the present invention utilizes the bottom of the vessel as a membrane by tying it to a conical membrane ring substantially tangent thereto at the weld joining the two. The membrane ring 2 hangs from the supporting ring 4 and the structure functions as though a membrane sheet were stretched tightly over the supporting ring 4 and the vessel supported thereon.

The invention utilizes the wall of the vessel within the circle of weld 3 as the membrane and since the location of weld 3 is within the circle of the circumferential weld 11 the invention also utilizes the excess design stress available in the sheet by reason of the required computation of the welds in the vessel at eighty percent of the strength of the plates.

In the specific construction example herein previously referred to the ring 2 may be about a foot wide and three-quarters of an inch thick. This thickness of the ring 2 enables the fillet weld 3 to be large and to spread over a substantial area of the surface of the vessel to thereby avoid undesirable stress concentrations.

The supporting ring 4 to which the membrane ring 2 is attached by weld 13 is fabricated as a circular I beam having a vertical web 14 welded to the center of a horizontal plate 15 constituting the lower flange of the beam support. An upper thick plate 16 is welded to the upper edge of web 14 and constitutes the upper flange of the beam. The weld 13 secures the ring 2 to the inner edge of upper plate 16. Vertical ribs 17 are preferably provided on the outer side of the supporting ring 4 to strengthen and add rigidity to the upper and lower flanges, the ribs 17 being welded to the lower plate 15, vertical web 14 and upper plate 16.

The upper plate 16 constitutes a compression ring which holds the membrane tight and prevents undue sagging of the vessel wall in the central bottom area within the circle of weld 3. The hoop tension in membrane ring 2 and weld 3, when added to that of the vessel wall prevents undue expansion and deformation of the vessel wall just above the ring 2 and adjacent the weld 3. At this location there may be a slight tendency of the vessel wall to sag from weight and to lie against the conical ring 2. The construction of the ring 2 tangent to the vessel wall at the joinder 3 provides for a supporting of the vessel wall by the ring should any slight sagging of the wall occur.

The location and diameter of ring 2 relative to the vessel wall should be such as to utilize as much of the available strength of the vessel wall for the membrane as possible and still stay within an economic construction. In general, for most practical purposes it will be satisfactory to locate the ring 2 with its weld 3 below the 45° angle on the lower quadrant of the vessel.

This location of the contact point or line between ring 2 and the vessel may be more simply expressed in terms of the angle of the conical ring 2 with the vertical at the point of contact. This is illustrated in Fig. 4 which gives a general force diagram for a given location.

Figure 4:
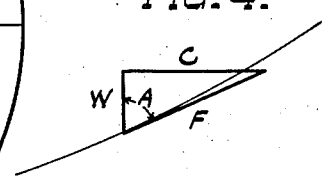
Fig. 4 is a stress or force diagram illustrating the components of force involved in the supporting membrane.

In Fig. 4 the weight of the vessel and its contents is represented by line W which for convenience is drawn vertical at the line of contact and is in terms of total weight divided by the length in inches of the circular line of contact between the inner edge of ring 2 and the vessel wall. The line F is disposed tangential to the wall of the sphere and represents the force or pull per inch of circumference in the conical ring 2 at the point of contact with the vessel wall as a component in the direction between weld 3 and weld 13. The component force F may be determined by drawing a horizontal line C at right angles to W from the upper end of the line W to the line F. C represents the radial component of force per inch of length acting on ring 4 and setting up compressional stresses therein.

The tangent line F should be at an acute angle A to the vertical line W, preferably not less than 45°. As the conical membrane ring 2 is enlarged in diameter its angle A to the perpendicular will progressively change to a smaller angle in order to maintain the tangential relationship of the ring to the vessel wall. As the ring 2 is made smaller the angle A becomes larger until it reaches a right angle when the ring is at the center of the bottom.

The best position of the ring 2 will depend upon the thickness and rigidity of the vessel wall and the weight of the vessel and its contents. For most practical purposes, a position in which the angle A is between about 45° and about 70° is preferable.

The invention may be applied to other types of vessels with horizontal circular contours such as an ellipsoid of revolution about a vertical axis. In such a case the weight of the liquid is usually a larger factor as related to the internal pressure than is the case with a spherical vessel. Where the bottom of such a vessel is more nearly flat the supporting membrane ring will be placed nearer the outer circumference of the vessel with the angle of the ring similar to that for spherical vessels.

Where the weight in the center is of primary importance and the radial support of the side walls of less importance, as in liquid storage tanks, it is possible to utilize a discontinuous membrane structure in the form of radial straps. Such a construction, however, does not provide the hoop tension feature of the invention and is not as satisfactory as a membrane.

The invention may have various embodiments within the scope of the accompanying claims.

I claim:

1. A support for a vessel of the class described, comprising a rigid compression ring encircling the vessel horizontally, and a tension member secured at its outer edge to said ring and at its inner edge to the vessel wall, said tension member lying substantially tangential to the vessel wall and in contact therewith along a circular horizontal line substantially below the horizontal equator of the vessel.

2. A support for a vessel of the class described, comprising a rigid compression ring encircling the vessel horizontally, and a tension member secured at its outer edge to said ring and at its inner edge to the vessel wall, said tension member lying substantially tangential to the vessel wall and in contact therewith along a circular horizontal line substantially below the horizontal equator of the vessel, said member making an acuate angle between about 45° and about 70° with the vertical axis of the vessel.

3. A support for a substantially spherical pressure vessel comprising a rigid corpression ring encircling the vessel horizontally, and a conical membrane-like ring welded at its outer upper edge to the compression ring and at its inner lower edge to the vessel wall, the vessel lying within the hollow of the membrane-like ring with the ring disposed substantially tangential to the vessel wall at the circular line of contact therebetween.

4. A support for a substantially spherical pressure vessel comprising a rigid compression ring encircling the vessel horizontally, and a conical membrane-like supporting ring welded at its outer upper edge to the compression ring and at its inner lower edge to the vessel wall, the vessel lying within the hollow of the membrane-like supporting ring with the membrane supporting ring disposed substantially tangential to the vessel wall at the circular line of contact therebetween, said membrane-like supporting ring making an acute angle between about 45° and about 70° with the vertical axis of the cone thereof.

5. A support for a vessel of the class described, in which the vessel has a single head plate at the bottom, comprising a supporting ring secured to the head plate at a horizontal circular line and disposed substantially tangential thereto, said ring being rigidly secured to a support at its outer circumference to apply tension forces to said head plate and thereby provide with said head plate a membrane-like support for the vessel.

6. A support for a vessel of the class described, comprising a metal ring disposed substantially tangential to the vessel wall at a horizontal circular line, and secured thereto to utilize a portion of the vessel wall as part of a supporting membrane, and a rigid horizontal supporting ring secured to said first named ring to suspend the same and the vessel therein.

7. A support for a vessel of the class described, comprising a metal ring disposed substantially tangential to the vessel wall at a horizontal circular line, and secured thereto to utilize a portion of the vessel wall as a supporting membrane, a rigid horizontally disposed supporting ring for suspending said ring, and a compression plate on the upper end of said supporting ring extending away from said vessel and spaced therefrom to hold the tangentially disposed ring tight and prevent undue sagging of the vessel wall in the central bottom area of the same.

8. A support for a vessel of the class described, comprising a metal ring disposed substantially tangential to the vessel wall at a horizontal circular line, and secured thereto to utilize a portion of the vessel wall as a supporting membrane, a rigid horizontally disposed supporting ring for suspending said tangentially disposed ring, a compression plate on the upper end of said supporting ring extending away from said vessel and spaced therefrom to hold the tangentially disposed ring tight and prevent undue sagging of the vessel wall in the central bottom area of the same, and means to additionally secure said plate to the lower portion of the supporting ring to add rigidity to the ring and prevent any substantial contact of said plate with the wall of the vessel.

9. A support for a substantially spherical pressure vessel comprising a rigid compression ring encircling the vessel horizontally, and a conical ring welded at its outer edge to the compression ring and at its inner lower edge to the vessel wall and tangentially disposed relative to the latter, the portion of the vessel wall lying within the tangentially disposed ring constituting therewith a membrane-like support for said vessel.

LEO REISER.